United States Patent [19]

Higuchi et al.

[11] Patent Number: 4,957,776
[45] Date of Patent: Sep. 18, 1990

[54] METHOD OF MANUFACTURING OPTICAL DISC

[75] Inventors: Masahiro Higuchi, Godo; Sadao Sakamoto, Ogaki; Yoshiharu Uchihara, Anpachi, all of Japan

[73] Assignee: Sanyo Electric Co., Ltd., Osaka, Japan

[21] Appl. No.: 293,748

[22] Filed: Jan. 3, 1989

[30] Foreign Application Priority Data

Jan. 14, 1988 [JP] Japan ..................... 63-6357

[51] Int. Cl.$^5$ ......................... B05D 3/06; B05D 5/06
[52] U.S. Cl. ................................... 427/54.1; 427/162
[58] Field of Search ............... 427/54.1, 162; 428/212; 264/1.1, 1.4, 1.7

[56] References Cited

U.S. PATENT DOCUMENTS

| | | | |
|---|---|---|---|
| 4,387,114 | 6/1983 | Conner et al. | 427/54.1 |
| 4,514,439 | 4/1985 | Rounds | 427/54.1 |
| 4,634,624 | 11/1987 | Tajima et al. | 428/212 |
| 4,649,073 | 3/1987 | Suzuki et al. | 478/212 |

FOREIGN PATENT DOCUMENTS 61180946  8/1986  Japan ................... 427/54.1

*Primary Examiner*—Stanley Silverman
*Attorney, Agent, or Firm*—Darby & Darby

[57] ABSTRACT

The method of manufacturing an optical disc related to the invention first forms warp prevention layer on one surface or the other surface of the disc substrate where information is recorded on one surface, and then, recording film covering the surface opposite from the surface having warp prevention layer or beam reflection film covering the information-recorded surface, and finally protection layer covering either the beam reflection film or the recording film, in this order. Thus the optical disc related to this invention can prevent damage and dust from incurring and adhering to the other surface of the disc substrate when forming these films on one surface so that the warp prevention layer can be perfectly level by suppressing swell of the layer itself. Since the warp prevention layer is formed on one surface before forming those films mentioned above on the other surface, the one surface maintains satisfactory wetness, and as a result, foam is rarely generated between the warp prevention layer and the disc substrate.

Furthermore, the method of manufacturing an optical disc related to the invention introduces a system which measures the warp of the disc substrate coated with warp prevention layer before coating protection film, and then properly adjusts the thickness of the protection film to a specific thickness enough to fully cancel the warp. This effectively minimizes warping of the disc substrate itself.

12 Claims, 5 Drawing Sheets

METHOD OF MANUFACTURING OPTICAL DISC

BACKGROUND OF THE INVENTION

1. Field of the Invention

The present invention relates to a method of manufacturing an optical disc such as digital audio disc which is conventionally called "compact disc" or an optical video disc.

2. Description of the Prior Art

The digital audio disc, called "compact disc" is commentated, for example, in "BROADCAST TECHNOLOGY" (pp. 316–317, April 1981) and "NIKKEI ELECTRONICS" (pp. 187–206, Aug. 17, 1981).

FIG. 1 is the schematic sectional view of a conventional compact disc. Information is recorded by pits on one surface of disc substrate 1 made from polycarbonate resin, and in addition, reflection film 2 made from aluminum is coated on the information recorded surface. Furthermore, protection layer 3 made from ultraviolet-hardening plastic on which label 4 is silk-screen printed, is formed on aluminum film 2. Total thickness "t" of the compact disc is about 1.2 millimeters.

Since information can be reproduced from the optical disc without using any mechanical means, users expect that the service life of any optical disc will last semi-permanently. However, there is still much uncertainty about the actual service life of those optical discs in the market. Any optical disc is carved to make a large number of minute pits densely on the plastic surface, and thus, extremely precise processing technology is required. This means that even the slightest invisible deformation degrades physical property of the optical disc. In particular, compact discs are expected to replace conventional magnetic-tape car audio system. However, there is a problem ought to be solved that the probability of the compact disc deformation caused under the mounted condition on the car audio playback system. Above all, warping of the compact disc is a critical problem.

FIG. 2 is the partial sectional view of a compact disc. It is essential for the audio system to satisfactorily reproduce information by controlling warp angle $\theta$ to a maximum of 1.6°, where warp angle $\theta$ is generated by light Bout which is reflection of light Bin perpendicularly incident upon the basic surface of the compact disc, i.e., the surface of the compact disc in contact with the turntable. Any conventional compact disc warps if it is exposed to high temperature, e.g., 100° C. for a certain while, and yet, once the disc warps, its surface cannot recover perfect flatness any more even under room temperature.

Next, process for forming warp prevention layer on the surface of disc substrate opposite from the information-recorded surface using a conventional compact disc manufacturing equipment is described below. First, reflection film 2 is formed for protecting the information-recorded surface 1a of the disc substrate 1. Next, label printing is executed on the protection film 3 to complete the production of a conventional compact disc before eventually forming warp prevention layer on the surface of the disc substrate opposite from the information-recorded surface 1a.

However, while forming reflection film 2 and prevention film 3 based on those sequential processes mentioned above, dust easily adheres to one surface of the disc substrate 1 opposite from the information-recorded surface 1a before eventually forming warp prevention layer. If the warp prevention layer were formed on the dust-deposited surface, a huge number of convex swells will be generated owing to dust particles. Even when no dust adheres to the surface of disc substrate 1 without recorded information, wettability of the surface on which supposed to form warp prevention layer becomes poor as time passes by. This causes to remain foam between the said surface 1 and the warp prevention layer when forming warp prevention layer, thus generating convex swells all over the warp prevention layer.

Since the compact-disc playback system reproduces information signals using light that enters from the warp prevention layer side and reflects from the substrate surface, presence of those convex swells affects adversely the optical information reproducing ability. Consequently, it is extremely important for the information signal reproducing system to prevent from occurring convex swells as much as possible.

SUMMARY OF THE INVENTION

The invention has been achieved for fully solving those technical problems mentioned above by providing the following:

The primary object of the invention is to provide a novel system for manufacturing optical disc, in which the system first forms a warp prevention layer on one surface of disc substrate opposite from the information-recorded surface, and then forms reflection film to fully coat the information-recorded surface before eventually forming protection film which fully covers reflection film.

The second object of the invention is to provide a novel system for manufacturing optical discs, in which the system first forms warp prevention layer on one surface of the disc substrate, and then forms information recording film on the other surface before eventually forming protection film which fully covers the information recording film.

The above and further objects and features of the invention will more fully be apparent from the following detailed description with accompanying drawings.

DESCRIPTION OF THE PREFERRED EMBODIMENTS

Referring now more particularly to the accompanying drawings, a preferred embodiment of the invention is described below.

Figure 1:
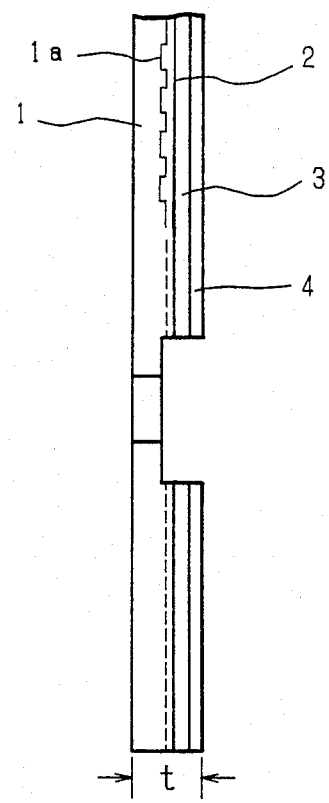
FIG. 1 is the sectional view of a conventional optical disc.
Figure 2:
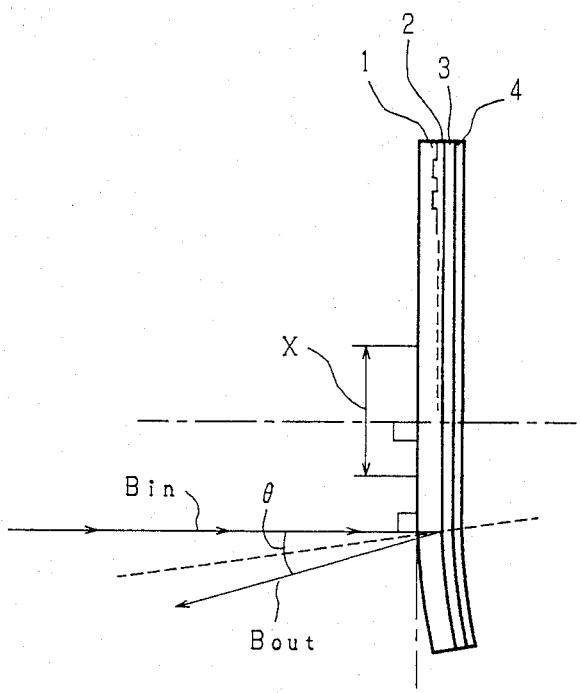
FIG. 2 is the partial sectional view showing the warped condition of a conventional optical disc.
Figure 3:
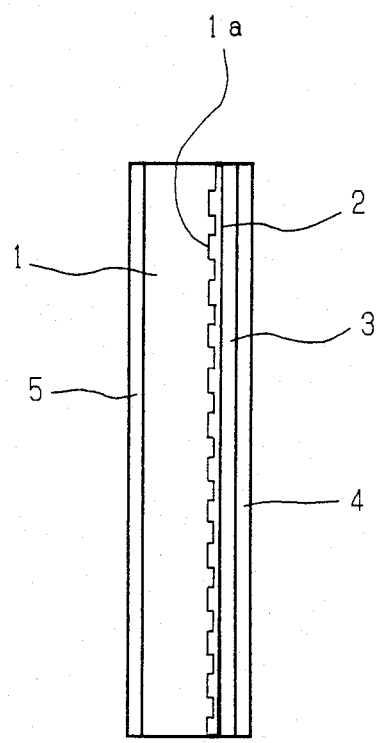
FIG. 3 is the sectional view of the optical disc manufactured by the process related to the invention.
Figure 4A:
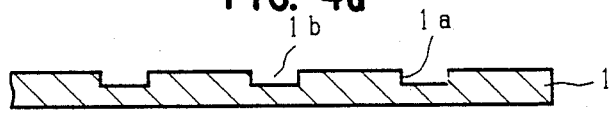
FIGS. 4(a) through (e) are respectively the diagrams showing the sequential processes for manufacturing the optical disc related to the invention.
Figure 4B:
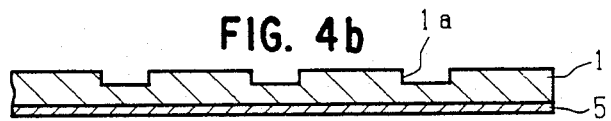
Figure 4C:
Figure 4D:
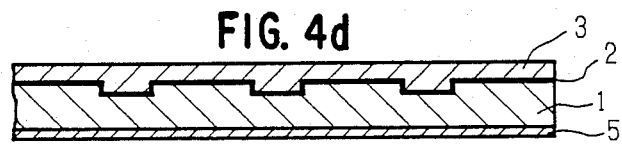
Figure 4E:
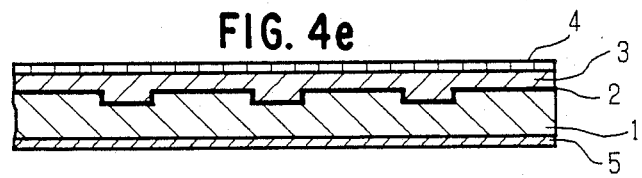

FIG. 3 is the sectional view of the optical disc manufactured by the process related to the invention. It represents an example of an optical compact disc with a warp prevention layer on one surface of disc substrate 1, opposite from the information-recorded surface. The other surface of the disc substrate 1 opposite from the warp prevention layer 5 is designated to be the information recording surface 1a carving a large number of pits, while the information recorded surface 1a is coated with beam reflection film 2 made from aluminum. The surface of the beam reflection film 2 is coated with protection film 3, on which label 4 is silk-screen printed. This optical disc is manufactured by those processes described below.

As shown in FIG. 4(a) through (e), in the first process, polycarbonate resin is pressed into a disc substrate 1 having about 1.2 millimeters of thickness. During the first process, a large number of pits 1a are molded by press-molding on the upper surface of the disc substrate 1 to provide information-recorded surface.

In the second process, immediately after forming up the disc substrate 1, warp prevention layer 5 is formed on the bottom surface of the disc substrate 1, having about 1 to 2 microns of thickness is made from resin with low shrinkage percentage which is hardened on exposure to ultraviolet rays and has a minimum of surface more than 2H to 3H.

In the third process, either by evaporation or sputtering, beam reflection film 2 having about 500 through 1,000 Å (angstrom) of thickness is made from aluminum on the information-recorded surface 1a.

In the fourth process, protection film 3 having 3 through 6 microns of thickness is formed on the beam reflection film 2 by UV-setting resin with surface hardness 1H to 2H.

In the fifth process, label 4 is silk-screen printed on the protection film 3.

The warp prevention layer 5 and the protection film 3 are formed by spin-coating which forms coating film with centrifugal force of dripped resin. If the magnitude of the warp caused by the formation of beam reflection film and protection film were obvious, manufacturer can properly select material and thickness of the warp prevention layer to fully cancel warping of the disc substrate 1.

The warp prevention layer 5 and protection film 3 are different from each other in required functions. Since the warp prevention layer 5 is formed on the light projection and reflection side, optical homogeneity is required for the warp prevention layer 5. In addition, solidity is also required for the warp prevention layer 5 to prevent the disc substrate 1 from being easily damaged. It is thus necessary that resin used for the warp prevention layer 5 being of low viscosity to form a thin layer easily, and yet, it should be sufficiently hard after being hardened. On the other hand, since protection film 3 is formed on the side unconcerned in light projection and reflection, optical homogeneity is not required, and in addition, uneven thickness is not a critical problem. Nevertheless, it is essential for the protection film 3 to fully protect minute pits on the information-recorded surface 1a carved on the disc substrate 1 and also fully protect beam reflection film 2 from moisture. So that, it is necessary that the protection film 3 rather being not too hard after hardening.

To prevent the disc substrate 1 from warping itself, it is essential that the contractile force of the warp prevention layer 5 and the protection film 3 is delicately balanced. To balance the degree of warp between these layers having different thickness each, it is essential that each contractile force should be different.

Concretely, when implementing the above preferred embodiment, inventors used "DAICURE-CLEAR" TH-13, a resinous product of Dainippon Ink Co., Japan, for forming warp prevention layer 5 and "DAICURE-CLEAR" EX-301 for forming protection film 3. "DAICURE-CLEAR" TH-13 has a feature of low viscosity easily form homogeneous thin film layer having 1 to 2 microns of thickness, and of about 3H hardness of a pencil fully resistant against scratching, and of about 12% volumetric shrinkage percentage. "DAICURE-CLEAR" EX-301 has about half the volumetric shrinkage percentage of the former and since the protection film 3 needs to protect beam reflection film 2, at least 3 through 6 microns of thickness is essential. By effective combination of both resinous products cited above, balance of the constractile force between warp prevention layer 5 and protection film 3 was maintained to prevent the disc substrate 1 from warping itself. In place of "DAICURE-CLEAR" EX-301, "DAICURE-CLEAR" SD-17 may also be employed.

Though a variety of materials can also be used for forming warp prevention layer 5 and protection film 3 to prevent the disc substrate 1 from warping itself, from the standpoint of processing convenience and freedom in the choice of physical characteristic, acrylic resin hardened on exposure to ultraviolet rays is preferable.

Figure 5:
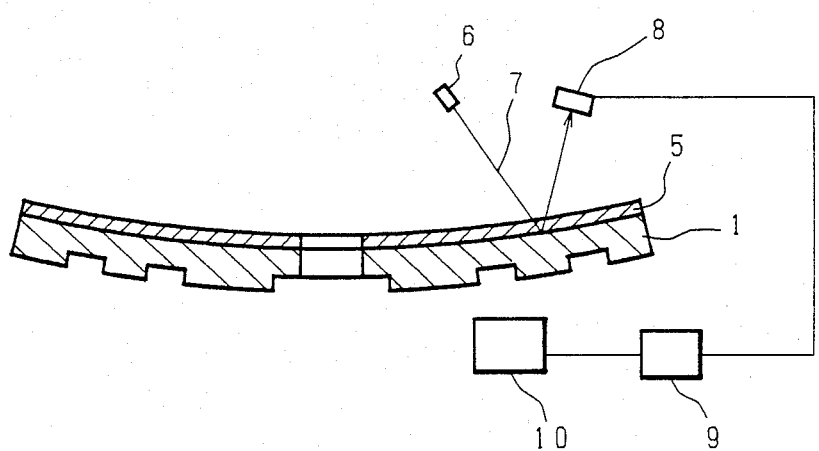
FIG. 5 is the schematic block diagram needed for implementing another preferred embodiment of the system for manufacturing the optical disc related to the invention.

The preferred embodiment shown in FIG. 4 predetermines the amount of resin to be dripped for forming protection film 3. FIG. 5 represents the schematic block diagram of the apparatus which measures warp of the disc, after formation of warp prevention layer 5, and controls the amount of resin to be dripped for forming protection film 3 in reference to the result of the measurement. This method can minimize warping of the disc as described below.

Press-molded disc substrate 1 rarely warps itself. However, when forming warp prevention layer 5 on the disc substrate 1, due to contractile force of the warp prevention layer 5, disc substrate 1 slightly warp itself to cause the information-recorded surface 1a to become convex.

Like those sequential processes shown in FIG. 4(a) through (e), first, warp prevention layer 5 is formed, and then, beam reflection film 2 is formed on the information-recorded surface 1a before eventually forming protection film 3 which covers beam reflection film 2. Apparatus shown in FIG. 5 executes an additional process for detecting warp of the disc substrate 1 caused by contractile force of the warp prevention layer 5.

The apparatus shown in FIG. 5 measures warp of the disc substrate 1 after forming the warp prevention layer 5, or after forming beam reflection film 2. Since the warp shapes the disc like a shallow-dish, the magnitude of the warp can be measured by detecting the maximum value of the warped angle at a constant length of radius while rotating the disc substrate 1 by a full turn. For example, when checking a disc substrate having 12 cm of diameter, curved angle is measure at 5 cm of radius.

Curved angle is measured by radiating laser beam 7 from laser source 6 at a minor incident angle like 5° for example, and then beam-position sensor 8 detects spot position of reflected light. The beam position sensor 8 incorporates beam-position sensing elements obtains data related to warp of the disc by analogue signals outputted from sensing elements. Using this analogue signals, controller 9 calculates the amount of dripping resin needed for forming protection film 3 which is used for canceling warp of the disc substrate 1. In response to the calculated amount of dripping resin, controller 9 controls resin-dripping unit 10. After the protection film 3 is formed by dripping resin from resin-dripping unit 10, due to contractile force, the disc substrate 1 is almost free from warp. The controller 9 preliminarily stores information related to the optimum amount of resin to be dripped in proportion to all the warping angles in order that the controller 9 can generate signals containing the optimum amount of dripping resin related to the warp data of the disc substrate 1 after the warp prevention layer 5 is formed on it.

Polycarbonate resin used for disc substrate 1 has about 1.55 of refractive index. By additionally forming a thin film layer having 1,600 Å (angstrom) of thickness and 1.24 of refractive index over the polycarbonate resin film mentioned above, the warp prevention layer 5 can prevent effectively reflection of beam. At present, ideal condition cannot perfectly be met in the thickness and refractive index of the warp prevention layer 5, however, selecting another material having about 1.45 of refractive index lower than that of polycarbonate resin, warp of the disc can be prevented to a certain extent.

The above preferred embodiment has solely referred to the method of manufacturing optical discs, i.e., read-only type discs, each having a disc substrate which is provided with information-recorded surface 1a at one surface, beam reflection film 2, and protection film 3. However, the scope of the invention does not limit its applicability merely to those discs mentioned above, but the scope of the invention is effectively applicable also to those optical discs each having a disc substrate, information-recording film and protection film covering the information-recording film, i.e., to write-once type or erasable type discs as well. Note that all the accompanying drawings are shown by way of enlargement for better explication.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method of manufacturing an optical disc, comprising the steps of providing a disc substrate where information is recorded on one side;
    first forming a warp prevention layer on the other side of said disc substrate;
    second forming a beam reflection film on said one side of said disc substrate; and
    third forming a protection film covering said beam reflection film, the step of first forming taking place before the step of second forming so as to avoid deterioration in wettability of the other side of said disc substrate that would otherwise take place if the step of second forming were effected before the step of first forming.

2. The method of manufacturing an optical disc as set forth in claim 1, further comprising measuring warp of said disc substrate coated with said warp prevention layer after completing the step of first forming or second forming, and then fixing the thickness of said protection film in order that the warp can be canceled from said disc substrate.

3. The method of manufacturing an optical disc as set forth in claim 1, wherein said warp prevention layer is substantially composed of resin, further comprising hardening the resin harder than the hardness of said protection film.

4. The method of manufacturing an optical disc as set forth in claim 1, wherein said warp prevention layer is substantially composed of acrylic resin which is hardened on exposure to ultraviolet rays.

5. The method of manufacturing an optical disc as set forth in claim 1, wherein volumetric shrinkage percentage is different between said warp prevention layer and protection film.

6. A method of manufacturing an optical disc comprising the steps of providing a disc substrate;
    first forming a warp prevention layer on the other side of said disc substrate;
    second forming a recording film on said one side of said disc substrate; and
    third forming a protection film covering said recording film, the step of first forming taking place before the step of second forming so as to avoid deterioration in wettability of the other side of said disc substrate that would otherwise take place if the step of second forming were effected before the step of first forming.

7. The method of manufacturing an optical disc as set forth in claim 6, further comprising measuring a warp of said disc substrate coated with said warp prevention layer after completing either the step of first or second forming, and then fixing the thickness of said protection film in order that warp can be canceled from said disc substrate.

8. The method of manufacturing an optical disc as set forth in claim 6, wherein said warp prevention layer is substantially composed of resin, further comprising hardening the resin harder than the hardness of said protection film.

9. The method of manufacturing an optical disc as set forth in claim 6, wherein said warp prevention layer is substantially composed of acrylic resin which is hardened on exposure to ultraviolet rays.

10. The method of manufacturing an optical disc as set forth in claim 6, wherein volumetric shrinkage percentage is different between said warp prevention layer and protection film.

11. A method of manufacturing an optical disc as set forth in claim 1, further comprising:
    balancing contractile forces between the warp prevention layer and the protection film.

12. A method of manufacturing an optical disc as set forth in claim 6, further comprising:
    balancing contractile forces between the warp prevention layer and the protection film.

* * * * *